Aug. 2, 1938.  A. A. SCARLETT  2,125,359
ADJUSTABLE ROD WEEDER POINT
Filed March 5, 1937
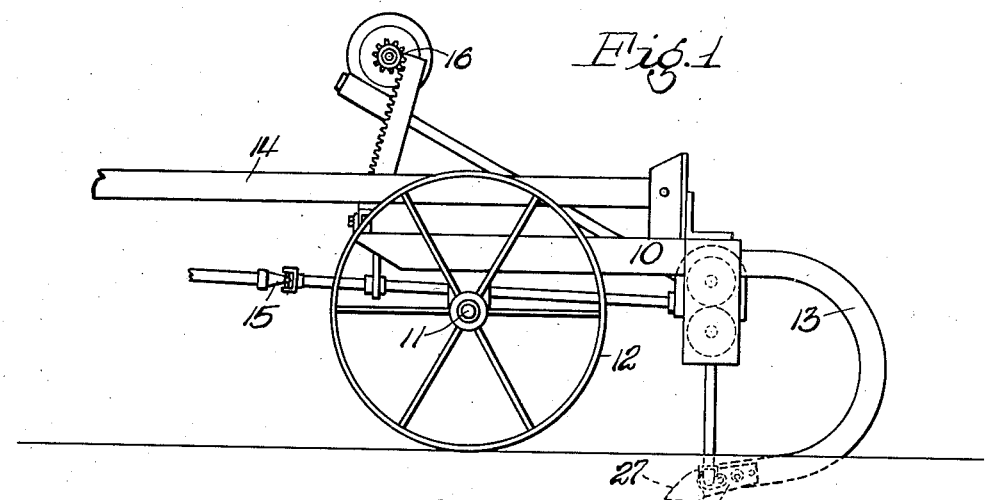
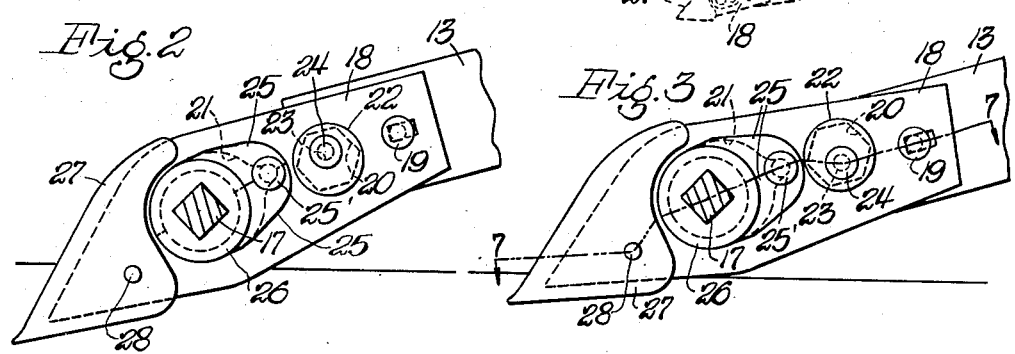
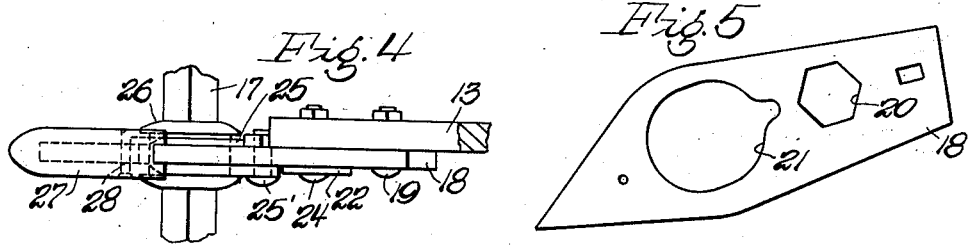
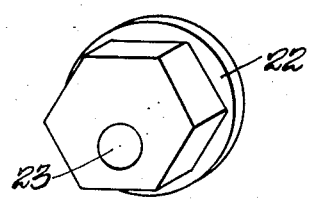
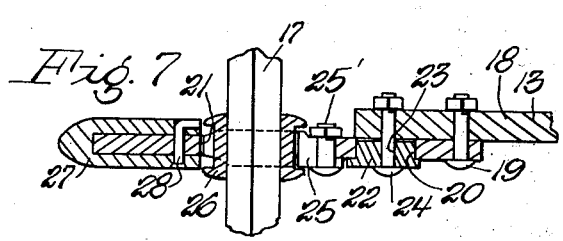

Patented Aug. 2, 1938

2,125,359

UNITED STATES PATENT OFFICE 2,125,359

ADJUSTABLE ROD WEEDER POINT

Arthur A. Scarlett, Hamilton, Ontario, Canada, assignor, by mesne assignments, to International Harvester Company, Chicago, Ill., a corporation of New Jersey Application March 5, 1937, Serial No. 129,135

8 Claims. (Cl. 97—42)

This invention relates to a rotary rod weeder and more particularly to an adjustable shoe and a detachable point therefor.

In the class of agricultural implements in which subsoil rotary rods are utilized, the provision of bearings which must necessarily operate under the soil is one of the major problems. The rods are forced broadside through the soil as they are rotated by power driven means. As the rods travel through the subsoil, they uproot weeds and other plant growth and cultivate the soil by loosening and turning over the material. The rod, usually square in cross section, is supported from the main frame of the implement by a number of beams or shanks, goose-neck in shape, at laterally spaced intervals. Each shank is provided with a bearing shoe at which the journal bearing for the rotary rod is mounted.

In the construction of rod weeders, a wheeled frame, having goose-neck shanks, is provided with means for adjusting the depth of the points by fulcruming the frame of the weeder about the axle.

In rod weeder shoes provided with rounded points, it develops in certain conditions that the suction of the point is not correct for varying depths of cultivation. With a fixed point of adjustment, such as fulcruming the frame on the axle, the suction of the point is reduced as the rod is adjusted deeper into the ground, and while the suction is correct for operating the rod shallow, it is not correct for operating the rod at greater depths. Also, in certain soils, it is found desirable to operate the weeder with the conventional flat shoe without a rounded point, and while adjustment of the shoe is desirable, it is still more desirable when the round point is employed.

It is an important object of the invention, therefore, to provide a rod weeder shoe secured to the rod weeder shank for adjustment with respect thereto.

Another important object is to form the point, easily attachable and detachable point for the forward end of the rod weeder shoe.

Another important object is to form a point, in such a manner, that the rearward portions thereof act as a shield for the rod weeder bearing.

Another object is to provide an opening in the rod weeder shoe and a complementary member adapted to fit therein, said complementary member being formed with an adjustable securing means for adjustably positioning the shoe on the shank.

Still another object is to provide a means for easily and quickly attaching the shoe.

Briefly, these and other objects are achieved by providing an adjustable rod weeder shoe formed with an opening therein and a complementary member adapted to fit therein, said shoe being pivotally attached to the rod weeder shank. The complementary member is formed with an opening eccentrically positioned therein, whereby angular positioning of the complementary member about the eccentric opening and in the opening in the shoe adjusts the shoe about its point of pivotal attachment to the rod weeder shank. An easily attachable and detachable point is fitted over the end of the shoe and is formed, in such a manner, as to protect the rod weeder point from the entrance of dirt. A more complete understanding of the invention may be had from the following detailed description with reference to the accompanying sheet of drawings, in which:

Figure 1 is a general side elevation of a conventional type of rod weeder showing the shanks and the means for adjusting the same, and also showing the new and improved point in position thereon;

Figure 2 is an enlarged side elevational view of the lower end of the rod weeder shoe and point showing the shoe and point adjusted at the lowest position;

Figure 3 is a similar view showing the shoe and point adjusted in the uppermost position;

Figure 4 is a plan view of the shoe, point and shank, as shown in Figures 2 and 3, showing the relationship between the point and the rod weeder bearing;

Figure 5 is a detailed side elevational view of the rod weeder shoe with its complementary parts removed;

Figure 6 is an oblique perspective view of the complementary adjusting member; and, Figure 7 is a horizontal sectional view taken substantially along the line 7—7 of Figure 3, and showing more in detail the relationship between the shank, shoe, point, rod weeder bearing and adjusting member.

As shown in Figure 1, a rod weeder frame 10 is supported on an axle 11 and wheels 12, only one of which is shown. A plurality of gooseneck shanks 13, only one of which is shown, are attached to the frame 10 at the rearward end thereof. The particular rod weeder, illustrated herein for the purpose of describing a preferred embodiment of the invention, is provided with a power drive for the rod and a power lift for the adjustment of the shanks 13. A hitch bar 14 is adapted to be connected to a tractor, not shown. As is well known to those skilled in the art, the power drive mechanism is of conventional construction and comprises shafting 15 adapted to be driven from the power take-off shaft of the tractor. The power lift mechanism is driven from this shafting and operates a rack and pinion 16. The rack is connected to the rod weeder frame 10, all of which is conventional construction. A rod weeder rod 17 is also driven by the power shafting 15, as is customary, and extends horizontally through the shanks 13 behind the axle 11 and parallel thereto.

At its lower end, each rod weeder shank 13 is provided with a pair of spaced openings. A rod weeder shoe 18 is pivotally secured to the rearward opening by a bolt 19. The shoe has formed therein, an opening 20 and forwardly thereof, a larger opening 21. In the illustration of the preferred embodiment of the invention, the opening 20 is shown as being hexagonal in shape, although any desired shape may be used. As best shown in Figures 6 and 7, a complementary adjusting member 22 is fitted into the opening 20. The member is provided with an eccentrically positioned opening or bore 23 for a purpose to appear presently.

As best shown in Figure 7, a bolt 24 is inserted through the eccentric opening 23 and through the opening 20 and the rod weeder shank 13. It will be understood thus far, that in as much as the shoe 18 is pivotally attached to the rod weeder shank 13 by the bolt 19, the complementary adjusting member 22 together with the bolt 24 forms an adjustable securing means for adjusting the shoe 18 with respect to the shank 13. By removing the complementary member 22 and reinserting it in the opening 20 at different angular positions with respect to the eccentric opening 23, various positions of the shoe 18 may be obtained.

The rod weeder shoe 18 is provided at its forward end in the opening 21, hereinbefore referred to, with a support for the rod 17 which comprises a pair of complementary bearing sections 25 secured to the shoe 18 by a bolt 25', and a flanged bearing member 26 adapted to be encircled by the bearing sections 25 for rotation therein. The rod 17, as is conventional, is non-rotatably carried by the bearing member 26.

As best shown in Figure 7, the complementary bearing sections 25 are narrower at their forward ends than at their rear ends, the width of their forward ends being substantially equal to the thickness of the shoe 18. In rod weeder shoes of customary design, a gap is left at each side of the shoe adjacent the flanged bearing 26 and the narrow front portions of the complementary bearing sections 25. Because of the gaps, a considerable amount of soil obtained entrance to the bearing surface between the bearing 26 of the complementary bearing sections 25.

To overcome the problem of the soil entering the rod weeder bearing, besides facilitating operation of the rod weeder through certain kinds of soil, a point 27 has been provided and constitutes a part of the present invention. This point is preferably cast and is fitted over the forward end of the rod weeder shoe 18 and secured thereto by a securing means. As is shown in the drawing, the securing means is in the form of a nail 28 extending through the point 27 and the shoe 18. The nail 28 is preferably bent over at one end to hold the point 27 in place.

As best shown in Figures 4 and 7, the point 27 is considerably wider than the shoe 18, and at its rearward end is positioned adjacent the rod weeder bearing to form a protective shield for the bearing surface between the bearing member 26 and the complementary member 25. Thus far, it will be seen that provision is made for adjusting the shoe 18 with respect to the shank 13 by changing the position of the complementary member 22, as previously mentioned. Adjustment of the shoe 18 becomes necessary when the shank 13 is adjusted deeper into the ground as the suction of the shoe is reduced. And, conversely, as the shank 13 is adjusted up for the rod weeder to operate shallow, the suction on the point is increased; therefore, the adjustment is necessary to maintain the proper suction on the point.

It will be understood that the point 27 may be removed when certain soil conditions make such removal desirable. However, when the point 27 is in place on the shoe 18, it becomes more necessary to provide means for maintaining correct suction thereon. The point 27, as previously disclosed, prevents, to a large extent, the entrance of soil into the rod weeder bearing.

Thus, it will be apparent that a means has been provided on a rod weeder shoe for overcoming certain difficulties met in operating the rod weeder in various kinds of soil. It will also be apparent that the point 27 may be removed and the rod weeder operated without the same. The adjusting means, of course, is operative with or without the point 27 in place; although, the advantages obtainable from the adjusting means, as provided herein, become more apparent when the adjusting means is used in conjunction with the point 27.

It will be understood that while a preferred embodiment of the structure has been illustrated and described, numerous modifications and alterations may be made without departing from the spirit and scope of the invention as defined in the appended claims.

What is claimed is:

1. In a rod weeder having a shank, the combination with the shank, of a shoe, means pivotally securing the shoe to the shank, said shoe formed with an opening therein, a complementary member adapted to cooperate with the opening in the shoe, and a bolt extending eccentrically through said complementary member and through the shank to adjust the shoe about its pivotal connection with the shank for varying the suction of the shoe.

2. In a rod weeder having a shank, the combination with the shank, of a shoe, means pivotally securing the shoe to the shank, said shoe formed with an opening therein, a member adapted to fit in said opening and provided with an eccentric bore therethrough, a bolt extending through said bore and through the shank, whereby the member may be moved angularly about said bolt to vary the position of the shoe with respect to the shank.

3. In a rod weeder having a shank, the combination with the shank, of a shoe, means pivotally securing the shoe to the shank, said shoe formed with a hexagonal opening therein, a hexagonal member adapted to fit in said opening and provided with an eccentric bore therethrough, a bolt extending through said bore and through the rod weeder shank whereby the member may be moved angularly about said bolt to vary the position of the shoe with respect to the shank.

4. In a rod weeder having a shank for supporting a weeder rod and in combination, a narrow pointed shoe secured to said shank, a ground engaging point removably and rigidly secured to said shoe, said point having angularly related ground engaging surfaces, said shoe being adjustably pivoted to the shank on a transverse horizontal axis whereby the angles of soil engagement of the surfaces are alterable, and a journal member carried by the shoe for supporting the weeder rod.

5. In a rod weeder having a shank for supporting a weeder rod and in combination, a shoe having a ground engaging point secured to said shank, said point having angularly related ground engaging surfaces, said shoe being mounted on the shank for adjustment on a transverse horizontal axis whereby the angles of soil engagement of the surfaces are alterable, and a journal member carried by the shoe for supporting the weeder rod.

6. A rod weeder comprising a wheeled frame structure, a draft frame pivotally connected on a transverse axis to the frame structure, means for adjusting the position of the frame structure about its wheels as an axis relative to the draft frame, a shank carried rigidly by the frame structure, a shoe having an engaging point secured to said shank, said point providing angularly related ground engaging surfaces, said shoe being mounted on the shank for adjustment on a transverse horizontal axis whereby the angles of soil engagement of the point surfaces are alterable, a journal member carried by the shoe, a weeder rod rotatably mounted in said journal, and means for driving said rod.

7. A rod weeder comprising a wheeled frame structure, a draft frame pivotally connected on a transverse axis to the frame structure, means for adjusting the position of the frame structure about its wheels as an axis relative to the draft frame, a shank carried rigidly by the frame structure, a narrow pointed shoe secured to said shank, a relatively thick ground engaging point secured to said shoe, said point having angularly related ground engaging surfaces, said shoe being adjustably pivoted to the shank on a transverse horizontal axis whereby the angles of soil engagement of the point surfaces are alterable, a journal member carried by the shoe, a weeder rod rotatably mounted in said journal, and means for driving said rod.

8. In a rod weeder having a shank, the combination with the shank, of a shoe, means pivotally securing the shoe to the shank, said shoe formed with a polygonal opening therein, a polygonal member adapted to fit in said opening and provided with an eccentric bore therethrough, a bolt extending through said bore and through the rod weeder shank whereby the member may be moved angularly about said bolt to vary the position of the shoe with respect to the shank.

ARTHUR A. SCARLETT.